D. H. SIMMONS.
APPARATUS FOR STRAIGHTENING GRAIN UPON HARVESTERS.
APPLICATION FILED OCT. 5, 1908.
923,084.
Patented May 25, 1909.
2 SHEETS—SHEET 1.
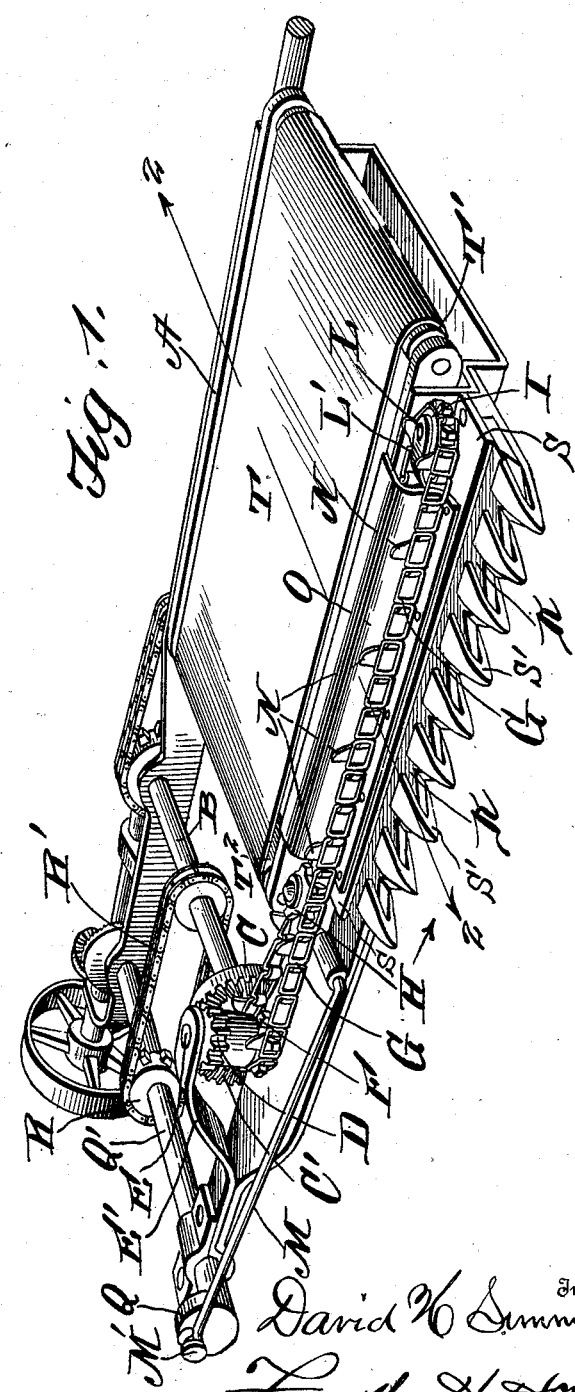

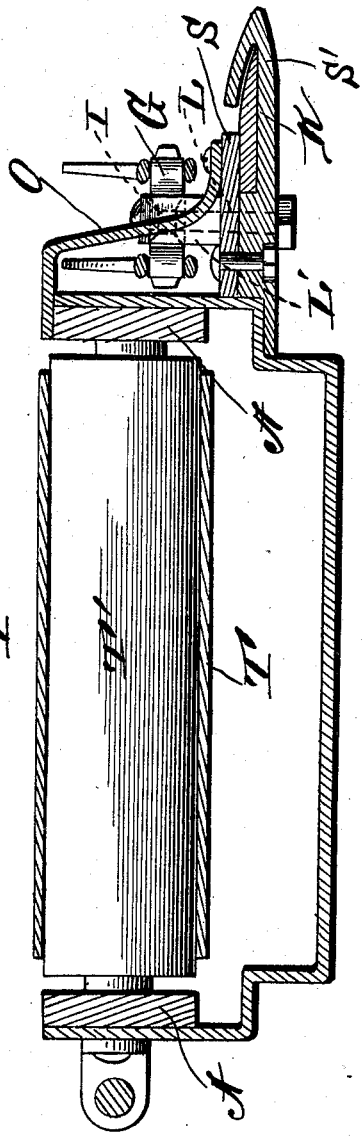

UNITED STATES PATENT OFFICE.

DAVID H. SIMMONS, OF AMERICUS, KANSAS.

APPARATUS FOR STRAIGHTENING GRAIN UPON HARVESTERS.

No. 923,084.　　　　Specification of Letters Patent.　　Patented May 25, 1909.

Application filed October 5, 1908. Serial No. 456,232.

*To all whom it may concern:*

Be it known that I, DAVID H. SIMMONS, a citizen of the United States, residing at Americus, in the county of Lyon and State of Kansas, have invented certain new and useful Improvements in Apparatus for Straightening Grain upon Harvesters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments to harvesters for the purpose of delivering the grain in proper shape to the conveyer apron after being cut by the cutter bar.

More specifically, the invention comprises an apparatus in which an endless sprocket chain is mounted upon edge adjacent to the cutter bar and having points projecting from the links thereof and adapted to carry the grain as it falls after being cut, back to the conveyer.

The invention comprises various other details of construction and combinations and arrangements of parts which will be hereinafter fully described and then specifically defined in the appended claim.

I illustrate my invention in the accompanying drawings, in which:—

Figure 1 is a perspective view of my attachment for harvesters. Fig. 2 is a side elevation.

Reference now being had to the details of the drawings by letter, A designates a portion of the frame of a harvester in which a shaft B is mounted, and C is a driving wheel which is fixed to said shaft and has gear teeth C' upon the face thereof adapted to communicate motion to a pinion wheel D which is keyed to a stub shaft E journaled at one end of the bracket arm E' and at its other end to the frame of the harvester. A sprocket wheel, designated by letter F, is also keyed to said stub shaft and furnishes means for communicating motion to the sprocket chain G which passes about the sprocket wheel H and also about a sprocket wheel I, both of which are journaled upon the frame of the harvester upon the cutter bar K. The upper end of the stub shaft L upon which the sprocket wheel I is mounted is journaled in a bracket arm L'. A guard plate O is mounted upon the plate S which is fastened to the finger bar S' and behind which the returning portion of the sprocket chain is adapted to travel, and affords means for preventing the chain carrying the grain in a reverse direction. Said sprocket chain is provided with a series of fingers N projecting upward from the links thereof and serve as means for catching the grain as it is severed and thrown back by the usual reel upon the harvester.

The cutter bar has a pitman M pivotally connected at one end thereof and its other end fastened to an eccentric pin M' upon the wheel Q which is fastened to the shaft Q'. Said shaft Q' is provided with a sprocket wheel R about which a sprocket chain R', which also passes about a sprocket wheel upon the main driving shaft B, passes and affords means for transmitting motion to the cutter bar as the endless grain carrying chain is operated.

A grain conveying apron, designated by letter T, passes about the reels T' and T² and upon which the grain falls after being fed forward by the sprocket chain which is mounted adjacent to the cutter bar. The endless apron is driven by any suitable connections with the main driving shaft.

From the foregoing it will be noted that by the provision of an attachment as shown and described, the grain as it is cut by the cutter bar and thrown back upon the platform by the usual reel, the butts falling in contact with the endless chain, will carry the grain to the elevating canvas straight, whereas with the harvesters as commonly constructed, the stalks of grain are apt to reach the canvas head foremost, and go to the binder in such a manner that after being bound, they are apt to loosen from the shocks thus entailing a considerable waste of grain.

With an apparatus embodying the features of my invention, the grain will be carried so that it will be delivered all in one direction and in suitable positions to be bound and securely held in bundles.

What I claim is:—

In combination with a conveyer frame, a horizontally disposed endless conveyer mounted thereon, a finger bar, a reciprocating sickle bar mounted thereon, a plate fastened to said finger bar, an inclined guard plate fastened at its lower edge to said plate upon the finger bar adjacent to its outer edge and its upper end extending toward said horizontally disposed conveyer, a conveyer chain, sprocket wheels upon which said chain travels, said chain passing about the ends of the guard plate, and upwardly projecting fingers upon the links of said chain, as shown and described.

In testimony whereof I hereunto affix my signature in the presence of two witnesses.

DAVID H. SIMMONS.

Witnesses:
 ARTHUR C. SIMMONS,
 WILLIAM ERNST.